United States Patent [19]

Forster

[11] 4,145,883
[45] Mar. 27, 1979

[54] HYDROSTATIC TRANSMISSION FOR TRACTORS AND THE LIKE

[75] Inventor: Franz Forster, Mühlbach, Fed. Rep. of Germany

[73] Assignee: Linde Aktiengesellschaft, Wiesbaden, Fed. Rep. of Germany

[21] Appl. No.: 819,143

[22] Filed: Jul. 26, 1977

[30] Foreign Application Priority Data

Jul. 27, 1976 [DE] Fed. Rep. of Germany ....... 2633718

[51] Int. Cl.² .............................................. F15B 15/18
[52] U.S. Cl. ....................................... 60/458; 60/477; 60/490; 180/70 R
[58] Field of Search ................. 60/458, 487, 490, 477, 60/10; 180/66 R, 70 R

[56] References Cited

U.S. PATENT DOCUMENTS

| | | | |
|---|---|---|---|
| 2,942,581 | 6/1960 | Gaffney | 60/DIG. 10 |
| 3,135,093 | 6/1964 | Hoffman | 60/490 |
| 3,810,519 | 5/1974 | Galos et al. | 180/70 R |

Primary Examiner—Edgar W. Geoghegan
Attorney, Agent, or Firm—Karl F. Ross

[57] ABSTRACT

For tractors or like machines which can be provided, upon assembly, with either a hydrostatic transmission or a mechanical stepped-speed transmission, a transmission housing having a removable cover is provided. The machine has a drive shaft and a driven shaft and, according to the invention, a hydrostatic transmission is mounted intact upon the cover for introduction into and removal from the housing with this cover. The hydrostatic transmission comprises an inclined-disk variable-displacement pump whose input shaft is connected to the drive shaft and a hydraulic pump of the drive-flange type hydraulically connected to the pump and having an output shaft which is, in turn, connected to the driven shaft.

8 Claims, 2 Drawing Figures

HYDROSTATIC TRANSMISSION FOR TRACTORS AND THE LIKE

CROSS-REFERENCE TO RELATED APPLICATION

This application is related to my commonly assigned copending application Ser. No. 819,145 filed concurrently herewith, entitled "HYDROSTATIC TRANSMISSION."

FIELD OF THE INVENTION

My present invention relates to a hydraulic transmission system for tractors and like machines adapted, upon assembly, to have either a hydrostatic drive or a mechanical stepped-speed transmission between the driving and driven shafts, e.g. between a prime mover, such as an internal-combustion engine, and a load such as the wheels of the tractor.

BACKGROUND OF THE INVENTION

A hydrostatic transmission is commonly used for high-torque stepless speed control of a load having as an input a prime mover such as an internal-combustion engine or an electric motor.

The hydrostatic transmission can comprise a variable-displacement axial-piston pump whose input shaft is connected to the prime mover and whose displacement per revolution can be varied by tilting an inclinable plate, e.g. a swash plate, to vary the excursion of the axial pistons of the cylinder drum of this pump. The output element of the transmission can include a hydrostatic motor, i.e. an axial-piston motor whose cylinder drum is rotatable about an axis inclined to the output shaft and whose axial pistons act upon, for example, a drive flange which can lie perpendicular to the axis of the output shaft.

The pump is hydraulically coupled with the motor so that the latter is driven when the pump is rotated. Such hydrostatic transmissions have the advantage that they are able to provide stepless control of the speed ratio between the input shaft and the output shaft.

Because of the advantages of such hydrostatic transmissions, they are frequently incorporated in vehicle systems, e.g. agricultural tractors and building machinery, between the internal-combustion engine and the driven wheels of such vehicles. In this case, the support or chassis of the vehicle may have a driving shaft (drive shaft) which is connected directly or via a clutch or gearing with the crankshaft of an internal combustion engine, and a driven shaft shich is connected directly or via gearing (e.g. a differential) to the driven wheels of the vehicle.

In many cases, a mechanical transmission is desired between the engine and the driven wheels for stepped-speed control of the wheels, a mechanical transmission of this type being provided with shifting gears, which can connect the drive shaft with the driven shaft with gear ratios in predetermined steps.

In the fabrication of vehicles of this type, it is frequently required to switch over from the assembly of mechanical transmission vehicles to hydrostatic-transmission vehicles and vice versa. This has posed a problem heretofore since the housing structures and mounting means for the two different types of transmissions were so different that the switchover had to begin during assembly of the chassis and could not await assembly of the transmission structure itself. This was a significant problem especially in the production of tractors in which the transmission housing is constituted as a supporting part of the rear of the tractor. It was simply not possible heretofore to assemble the tractor apart from the specific transmission structure, place the latter on supports and mount the transmission in place, selecting between a hydrostatic variable-speed transmission and a mechanical stepped-speed transmission.

When attempts were made to solve this problem by designing the components of the hydrostatic transmission so that they could be accommodated in the housing which was otherwise designed to receive the mechanical transmission, the steps of assembling the hydraulic transmission in this housing were time-consuming and problematical.

OBJECTS OF THE INVENTION

It is the principal object of the present invention to provide a machine, e.g. a tractor, in which the aforementioned disadvantages are obviated and which can be readily assembled with a hydrostatic transmission or a mechanical transmission.

Another object of the invention is to provide a simplified transmission structure such that it can be readily accommodated in a tractor or like vehicle having a housing which can also receive, alternatively, a mechanical transmission.

Yet another object of the invention is to provide an improved tractor drive system which can be readily repaired.

Still another object of the invention is to provide a vehicle structure which afforts simplified assembling in a variety of forms.

SUMMARY OF THE INVENTION

These objects and others which will become apparent hereinafter are attained, in accordance with the present invention, in a machine which comprises a support, e.g. a vehicle chassis in the case of a tractor, carrying a drive shaft and a driven shaft, as previously described, and a transmission housing between these shafts, the transmission housing being adapted to accommodate a mechanical transmission.

According to the present invention, all of the parts of a hydrostatic transmission are mounted upon a cover which can be releasably connected (detachable and replaceable) to the transmission housing to connect the drive shaft with the driven shaft.

During assembly of the tractor or other machine, the latter can be supported without a particular transmission and can selectively be fitted with the stepped-speed mechanical transmission or with the hydrostatic transmission intact upon the cover so that the hydrostatic transmission is replaceable with the cover upon the housing, i.e. can be mounted with the cover on the housing and can be removed with the cover on the housing.

According to a feature of the invention, the components of the hydrostatic transmission which are carried by the cover include a hydraulic pump, preferably a variable-displacement axial-piston pump, an input shaft connected to this pump, a hydraulic motor hydraulically connected to the pump for fluid propulsion of the motor by the pump, and an output shaft connected to the motor and rotatable thereby. According to the invention, the input and output shafts of the hydrostatic transmission are provided with respective gears which, when the cover carrying the transmission is set into place on the housing, mesh with corresponding gears of the drive and driven shafts on the support or vehicle chassis.

This cover can be fabricated complete with the hydrostatic transmission in a factory in which such transmissions are normally made and can be supplied to the vehicle-assembly plant or, more generally, to the machine assembly plant as a unit. This, of course, eliminates the need for the vehicle or machine manufacturer to fabricate the transmission or even to mount the components of the hydrostatic transmission. It is only necessary to withdraw one of the aforedescribed units from stock and introduce the same into the transmission housing of a vehicle or machine when the latter is to be provided with a hydrostatic transmission, directly on the assembly line.

Since the hydrostatic transmission is supplied complete with the supporting cover, which functions as a base for all of the components of the hydrostatic transmission, it can be tested before being mounted in the vehicle or machine transmission housing, thereby eliminating the testing expense for the vehicle or machine manufacture and the space and personnel required for an appropriate test bench. Naturally, if the hydrostatic transmission becomes defective in use, it can be removed with the cover intact and can be subjected to testing and repairs as a complete unit, e.g. by returning the same to the transmission fabricator. To reduce the down time of the vehicle or machine, a defective hydrostatic transmission unit (including the cover) can be removed and replaced by a new or rebuilt unit.

According to a feature of the invention, the cover is fitted onto the upper side of the transmission housing which can be formed as an upwardly open trough so that the separating line lies at the top of the transmission housing and thus above any oil bath therein.

Alternatively, depending upon the transmission housing design, the cover can be applied from below or from one side, especially a longitudinal side.

To reduce oil losses, it is desirable to maintain in the transmission housing an oil level which lies below the space in which the rotating parts of the hydrostatic transmission are disposed so that these parts are only contacted with sprayed oil droplets and do not plunge into the standing oil bath.

According to a further feature of the invention, the input shaft of the pump of the hydrostatic transmission and the output shaft of the hydraulic motor are each provided with a gear while the drive shaft and driven shaft of the vehicle or machine reach into the transmission housing at a lower point thereof and are each provided with the respective gear within this housing. The gears of the drive and driven shafts are so positioned that, upon setting of the cover on the transmission housing, the gear of the input shaft of the pump meshes within the permissible tolerance within the gear of the drive shaft while the gear of the motor output shaft meshes with the gear of the driven shaft.

This construction eliminates, upon mounting of the cover/transmission unit upon the transmission housing, all adjusting and positioning operations.

As described in the aforementioned copending application, it has been common practice heretofore to provide a hydrostatic transmission in which both the hydrostatic pump and the hydrostatic motor are of the inclined-disk or swash plate configuration and the transmission has a compact configuration by having the cylinder drums back-to-back against a common body which is provided with the passages communicating between the pump and the motor. However, such transmissions combine the advantages of a light-weight, readily controllable pump with a hydrostatic motor which is not optimally efficient.

It is known, in addition, to provide a hydraulic motor of the drive-flange type, such motors having significantly higher efficiencies than the inclined-disk axial-piston motor described previously. However, such drive-flange motors have been provided heretofore separate from the pump, the connection between them being effected by appropriate conduits.

I have now found that it is possible to combine the advantages of a light-weight inclined-disk pump with a drive-flange hydrostatic transmission which is highly compact for use in the unit described above, if the cover is relatively elongated and is provided on one end with the pump and on the other end with the motor, an intermediate body being disposed between the cylinder drums of the pump and motor. The pump is an inclined-disk pump while the motor is a drive-flange motor as described in the aforementioned copending application.

According to this aspect of the invention, the side of the intermediate body turned toward the pump is provided with a cylindrically concave surface having an axis defining the tilt axis of the drum of the drive-flange motor, between the base of this drum and the concave surface of the body, there being disposed an intervening disk having a cylindrically concave surface of curvature corresponding to that of the concavity and shiftable therealong. The body can be provided with means for displacing this disk and hence the motor drum bearing thereagainst along the cylindrically concave surface whereby the displacement of the motor per revolution can be adjusted and the versatility of the hydrostatic transmission increased.

Not only does this structure provide advantages in terms of compact assembly and high versatility with respect to transmission ratios and control conditions, but it also enables all valves for pressure relief and control purposes to be disposed in this body and facilitates the fabrication of the transmission and the cover as a unit.

Further features of the transmission itself can be found in the aforementioned copending application.

For the purposes of the present application, an inclined-disk hydraulic machine will be understood to be a machine in which the cylinder drum lies along the axis of the associated shaft and has its pistons bearing upon a disk which can be tilted to either side of a neutral position in which this disk lies perpendicular to the common axis of drum and shaft. A drive-flange machine normally has the drive flange lying in a plane perpendicular to the axis of the shaft to which it is connected, the axis of the cylinder drum being inclined or inclinable to this flange and the axis of the shaft to which it is connected.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
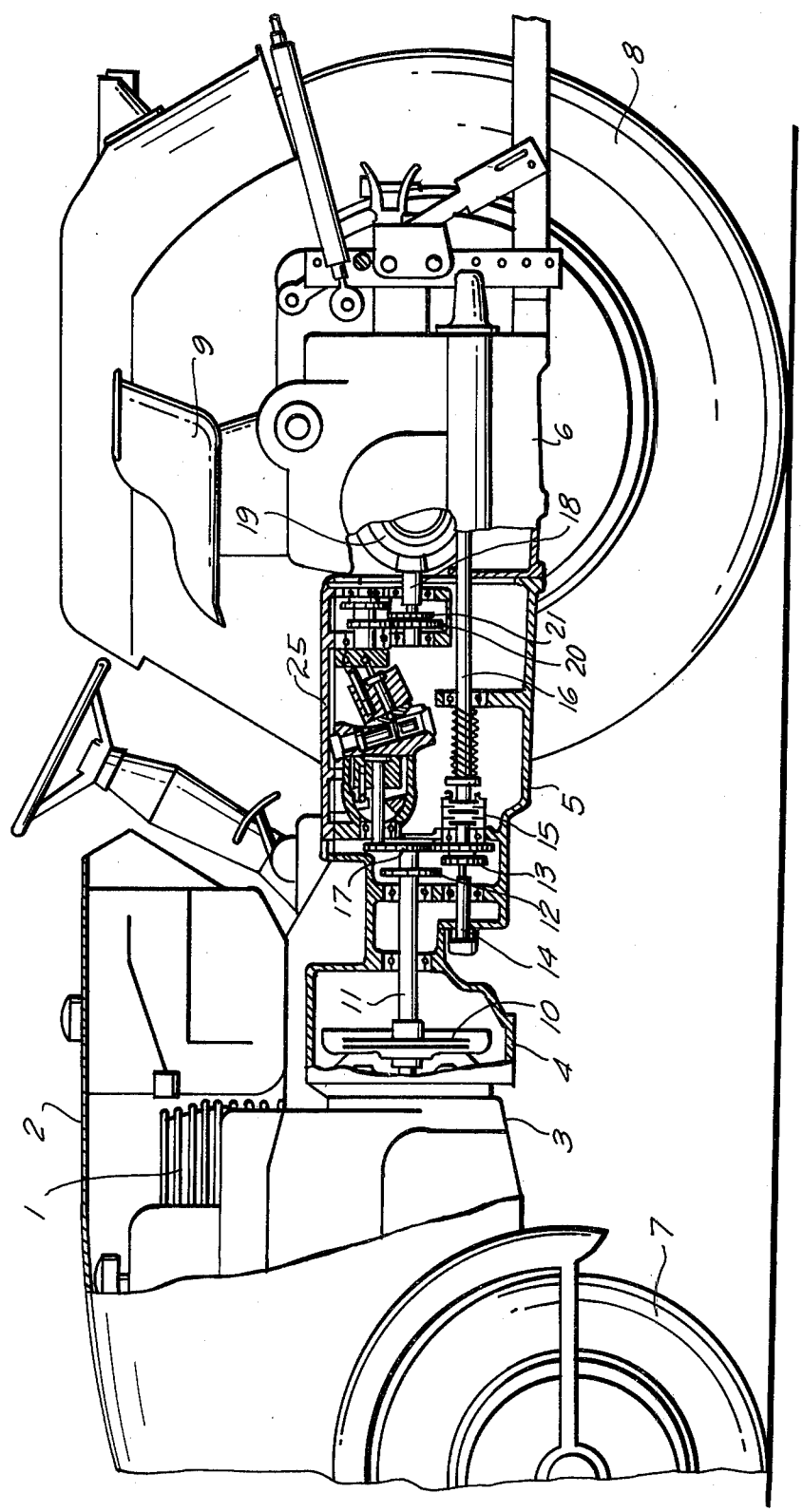
FIG. 1 is a diagrammatic side-elevational view partly broken away, of a tractor provided with the transmission according to the present invention.

In FIG. 1 of the drawing I have shown a tractor in which an internal combustion engine 1 is received under the hood 2 of the vehicle and has a crankshaft housing 3 upon which is mounted the usual clutch 10.

The clutch 10 is received in a clutch housing 4 which forms part of the transmission housing 5 extending longitudinally in the direction of travel of the vehicle and connected at its rear end with the axle drive housing 6. The parts 3–6 form the supporting chassis of the rear of the tractor.

The crankshaft housing 3 suspends the steerable front wheels 7 which are not driven while the axle housing 6 rotatably receives the driven wheels 8. The axle housing 6 also supports the driver's seat 9.

The mechanical clutch 10 in the clutch housing 4 connects the main drive shaft 11 of the vehicle with the crankshaft in the usual manner, the drive shaft 11 extending into the transmission housing 5 and carrying therewithin a gear 12 which can mesh with a gear 13 of a further shaft 14 journaled on this housing. The shaft 14 can be rotatably connected with the power takeoff shaft 16 by a clutch 15. The main drive shaft 11 also is formed within the transmission housing 5 with a gear 17, the latter constituting the drive gear mentioned previously.

The driven shaft 18 of the drive train for the tractor is also journaled in the transmission housing 5 and is connected by a mechanical differential gearing 19 to the two rear wheels 8 in the usual manner. The driven shaft 18 carries a pair of gears 20 and 21 which can be selectively engaged for the rotation of the shaft 18 at a selected one of two speeds. The gears 20 and 21 thus constitute a two-step mechanical transmission driving the driven shaft 18.

Figure 2:
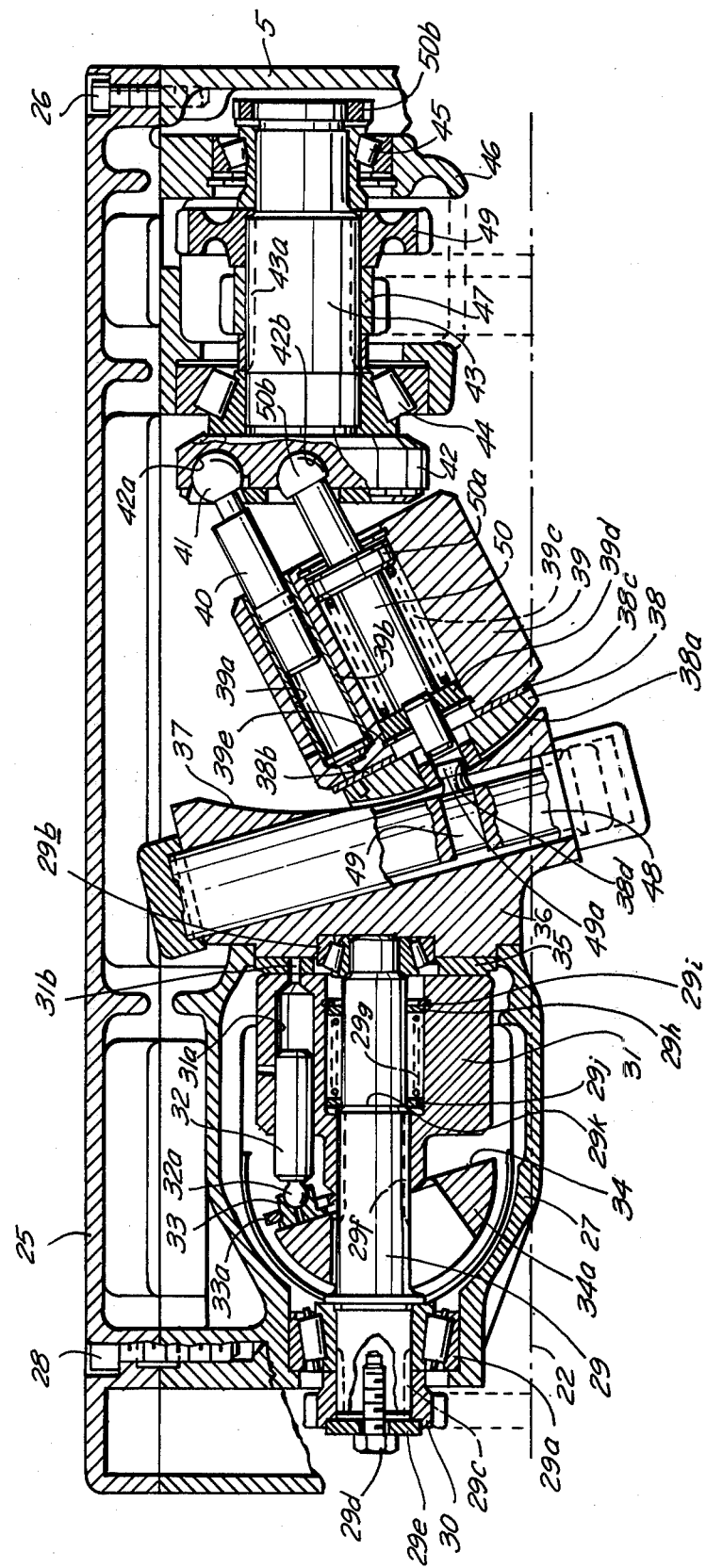
FIG. 2 is an axial cross-sectional view, drawn to an enlarged scale, of the hydrostatic transmission and cover unit used in FIG. 1.

The hydrostatic transmission, which is more fully described in the aforementioned copending application, has been shown in larger scale in FIG. 2. The centerline 22 represents the common axis of rotation of the shafts 11 and 18 of FIG. 1.

The upwardly open trough-shaped transmission housing 5 (FIG. 1) is closed by a cover 25 (FIGS. 1 and 2) which can be attached to the housing by screws 26 uniformly distributed about the periphery of the housing and illustrated only in FIG. 2.

The cover 25 forms a single unitary support for all of the elements of the hydrostatic transmission in the manner described previously. Consequently, the housing 27 of the hydrostatic pump is bolted to the underside of the cover 25 by screws 28 (FIG. 2).

The hydrostatic pump has a shaft 29 (input shaft) which is journaled in a roller bearing 29a at the left-hand end of the housing 27 and in a further roller bearing 29b in an intermediate body 36 which is described in greater detail hereinafter, this body 36 being fixed to the right-hand end of pump housing 27.

A gear 30 is rotatably coupled with the shaft 29 by splines 29c and is held onto the left-hand end of this shaft 29 by a screw 29d and a washer 29e. When the cover 25 is placed onto the housing 5, the gear 30 meshes from above with the gear 17 previously described.

The hydrostatic pump also comprises a pump cylinder drum 31 which is rotatably entrained by the shaft 29 via splines 29f but can shift longitudinally along this shaft under the action of a spring 29g which bears against a washer 29h seated against a split ring 29i received in a groove of the cylinder drum 30. At its other end, the spring 29g bears upon a washer 29j which rests against a shoulder 29k of the shaft 29. In addition, the cylinder drum is mounted with clearance upon the shaft 29 so as to be able to tilt slightly relative thereto.

The cylinder drum 31 is formed with a plurality of angularly equispaced cylinder bores 31a in each of which there is received a piston 32 which is reciprocatable axially in the respective cylinder bore and has a ball-shaped head 32a received with universal mobility in a shoe 33 which bears upon the planar control surface 34 of an inclined disk rocker 34a, the latter being tiltable about an axis perpendicular to the plane of the paper in FIG. 2 and to the axis of shaft 29 to vary the displacement of the pump by means of the structure described in the aforementioned copending application. A disk 33a holds the shoes 33 against the surface 34.

The base of the cylinder drum 31 is pressed by the spring 29a against a control or valve disk or plate 35, the latter being provided with the ports 31b of the hydraulic pump which successively communicate with the bores 31a of each of the cylinders in the usual manner. The valve plate 35, in turn, rests against the intermediate body 36 mentioned previously.

As described in the aforementioned copending application, this body can be provided with the passages which connect the pump with the hydraulic motor, safety, control or pressure-relief valve and means for varying the displacement of the hydrostatic motor as will be described.

Along its side turned away from the pump, the body 36 is formed with a concave cylindrical surface 37, the axis of which defines the pivot axis for the drum 39 of the hydrostatic motor. The drum 39 is, in turn, pressed against an intermediate disk 38 which is formed with a concave cylindrical surface 38a of a curvature corresponding to that of the concave surface 37 and adapted to ride thereon. The opposite face 38b of the disk 38 is a planar face against which the base of the cylinder drum 39 is pressed through the intermediary of an antifriction disc 38c.

The cylinder drum 39 of the hydraulic motor is provided with cylinder bores 39a which are lined with sleeves 39b defining respective axial cylinders for a plurality of angularly equispaced pistons 40 each of which has a ball-shaped head 41 received in a spherical socket 42a of a drive flange 42 which lies in a plane perpendicular to the axis of the output shaft 43 and is unitary therewith. In addition, the drum 39 is pressed against the disk 38 by a spring 39c which bears against a washer 39d resting upon a split ring 39e fitted into a groove of the cylinder 39. The spring 39c also bears against a shoulder 50a of a drum shaft 50 whose ball-shaped head 50b is received within a spherical socket 42b in the center of the drive flange 42.

The output shaft 43 is journaled in a pair of roller bearings in a journal block 46 formed at the right-hand end of the cover 25 and attached thereto, e.g. by bolts of the type shown at 28 in FIG. 2. The output shaft 43 carries a gear 47 which is splined thereto at 43a, the gear 47 being positioned to mesh with the gear 20 previously described. In addition, a gear 49 is rotatably entrained by the shaft 43 so as to be able to mesh with the gear 21. The gears 20 and 21 are connected together and are axially shiftable on the shaft 18 while being splined thereto so that, in the position shown in FIG. 1, gear 21 meshes with gear 47 while gear 21 is out of engagement with gear 49. When the gears 20 and 21 are shifted to the right, gear 49 meshes with gear 21. The gear ratios between gears 47 and 20 and gears 49 and 21 are different so as to provide the two-stage speed change transmission between the hydrostatic transmission and the differential gearing.

A locking nut 50b acting upon the inner race of bearing 45 holds the bearing assembly together.

The intermediate body is also connected to the underside of the cover by screws of the type shown at 28. The body 36 is formed with a cylinder bore receiving a setting piston 48 which can be displaced by control pressure along this bore, i.e. along a line inclined to the axes of the shafts 29 and 43. The piston 48 carries a pin 49 having a spherical head 49a which is received pivotally in a recess 38d of the disk 38 so that, as has been described in the aforementioned copending application, this pin can entrain the disk 38 to displace the same along the cylindrical surface 37 and hence tilt the drum 39 relative to the plane of the drive flange 42 and hence adjust the stroke of the pistons of drum 39.

The body 36 can, as has been noted earlier, be provided with the valves required for safety and pressure-relief purposes, for feeding hydraulic fluid to the system, with any necessary control and regulating elements and, if desired, with a fluid filter. To the extent that any of these elements cannot be built into the body 36, they may be simply connected, as part of the unit, to the underside of the cover 25. Any control members, e.g. levers, which may be required, can be disposed on the upper side of the cover 25.

As a consequence, when the cover 25 is removed from the housing 5, it carries with it the entire hydrostatic transmission in a single unit. When the cover is fitted onto the housing 5, conversely, it automatically permits engagement of the gear 30 with gear 17 and the gears 20 and 21, selectively, with the gear 49.

The hydrostatic transmission, when in use, operates in the usual fashion. Thus, the engine 1 drives the shaft 11 which, in turn, rotates shaft 29 of the pump to displace fluid to the hydrostatic motor. The drum 39 of the latter is thus caused to rotate, thereby driving the flange 42 and the shaft 43. The shaft 43, in turn, drives the shaft 18 which transmits rotation to the differential gearing 19 to rotate the wheels of the vehicle.

I claim:

1. A machine comprising:
   a support;
   a transmission housing on said support and open along a side;
   a cover replaceably mounted on said housing along said side;
   a drive shaft journaled on said support;
   a driven shaft journaled on said support; and
   a hydrostatic transmission in said housing; said transmission comprising at least the following components:
   a hydraulic pump,
   an input shaft connected to said pump for driving same,
   a hydraulic motor hydraulically connected to said pump for fluid-medium propulsion thereby, and
   an output shaft connected to said motor and rotatable thereby,
   said input being operatively connected to said drive shaft and said output shaft being operatively connected to said driven shaft, and said components of said hydrostatic transmission all being mounted upon said cover for removal and replacement therewith on said transmission housing, said input shaft and said output shaft being each provided with a respective gear, said drive shaft and said driven shaft each having respective gear in said transmission housing, the gears of said input and output shafts being positioned respectively to mesh with the gears of said drive and driven shafts upon the mounting of said cover on said housing.

2. The machine defined in claim 1 wherein said housing is upwardly open and said cover is seated on said housing from above, said components being mounted on the underside of said cover.

3. The machine defined in claim 2 wherein said drive and driven shafts are axially aligned with one another.

4. A machine comprising:
   a support;
   a transmission housing on said support and open along a side;
   a cover replaceably mounted on said housing along said side;
   a drive shaft journaled on said support;
   a driven shaft journaled on said support; and
   a hydrostatic transmission in said housing, said transmission comprising at least the following components:
   a hydraulic pump,
   an input shaft connected to said pump for driving same,
   a hydraulic motor hydraulically connected to said pump for fluid-medium propulsion thereby, and
   an output shaft connected to said motor and rotatable thereby,
   said input shaft being operatively connected to said drive shaft and said output shaft being operatively connected to said driven shaft, and said components of said hydrostatic transmission all being mounted upon said cover for removal and replacement therewith on said transmission housing, said pump being an inclined-disk axial-piston pump having a cylinder drum, said motor being a drive-flange axial-piston motor having a cylinder drum, said hydraulic transmission further comprising an intermediate body disposed between said cylinder drums and affixed to said cover, said intermediate body connecting said cylinder drums together, said intermediate body being formed with a cylindrical concave surface on a side thereof turned toward said motor, said transmission further comprising an intermediate disk disposed between said drum of said motor and said concave surface, said disk having a cylindrically convex surface riding upon said concave surface, said motor drum pressing said disk against said concave surface.

5. The machine defined in claim 4 wherein said input and output shafts are parallel to one another and laterally offset to have predetermined separations respectively from said drive and driven shafts.

6. The machine defined in claim 4, further comprising means in said body for displacing said disk along said concave surface.

7. The machine defined in claim 6 wherein said pump is formed with a pump housing mounted on the underside of said cover, said input shaft being journaled in said pump housing and in said body and being connected to said cylinder drum of said pump for rotating same, said motor comprising a drive flange fixed to said output shaft and lying in a plane perpendicular to the axis thereof, and a drum shaft rotatably carrying said drum of said motor, said drum shaft having a spheroidal socket formed in the center of said drive flange.

8. A machine comprising:
- a support;
- a transmission housing on said support and open along a side;
- a cover replaceably mounted on said housing along said side;
- a drive shaft journaled on said support;
- a driven shaft journaled on said support; and
- a hydrostatic transmission in said housing, said transmission comprising at least the following components:
  - a hydraulic pump,
  - an input shaft connected to said pump for driving same,
  - a hydraulic motor hydraulically connected to said pump for fluid-medium propulsion thereby, and
  - an output shaft connected to said motor and rotatable thereby, said input shaft being operatively connected to said drive shaft and said output shaft being operatively connected to said driven shaft, and said input shaft and output shaft, said hydraulic pump and said hydraulic motor components being mounted upon said cover for removal and replacement therewith on said transmission housing, said input shaft and said output shaft being each provided with a respective coupling member, said drive shaft and said driven shaft each having a respective coupling member in said transmission housing, the coupling member of said input and output shafts being positioned respectively to engage with the coupling members of said drive and driven shafts upon the mounting of said cover on said housing.

* * * * *